United States Patent [19]
Mackintosh et al.

[11] Patent Number: 5,993,737
[45] Date of Patent: Nov. 30, 1999

[54] STABILIZATION OF WATER

[75] Inventors: Grant S. Mackintosh, Stellenbosch; Hendrik A. De Villiers, Paarl, both of South Africa

[73] Assignee: Implico B.V., Netherlands

[21] Appl. No.: 08/945,643

[22] PCT Filed: Apr. 18, 1996

[86] PCT No.: PCT/NL96/00167

§ 371 Date: Jan. 8, 1998

§ 102(e) Date: Jan. 8, 1998

[87] PCT Pub. No.: WO96/33952

PCT Pub. Date: Oct. 31, 1996

[30] Foreign Application Priority Data

Apr. 24, 1995 [ZA] South Africa .............. 95/3309

[51] Int. Cl.$^6$ ............... C02F 1/66; C02F 1/68
[52] U.S. Cl. ............... 422/14; 422/12; 422/13; 422/139; 422/211; 422/900; 210/724; 210/749; 210/750
[58] Field of Search ............ 422/14, 139, 140, 422/145, 7, 12, 13, 17, 141, 142, 188, 189, 190, 211, 234, 242, 900; 210/724, 743, 749, 750

[56] References Cited

U.S. PATENT DOCUMENTS

| | | | |
|---|---|---|---|
| 3,839,199 | 10/1974 | Weiss et al. | 210/724 |
| 4,153,556 | 5/1979 | Riedinger | 210/218 |
| 4,188,291 | 2/1980 | Anderson | 210/724 |
| 4,814,074 | 3/1989 | Auchincloss | 210/143 |
| 5,156,746 | 10/1992 | Maree et al. | 210/724 |
| 5,174,901 | 12/1992 | Smith | 210/652 |
| 5,695,646 | 12/1997 | Graf | 210/724 |

FOREIGN PATENT DOCUMENTS

| | | |
|---|---|---|
| 1246250 | 12/1988 | Canada . |
| 1904410 | 11/1977 | Germany . |
| 043545 | 11/1987 | Hungary . |
| 59-016591 | 1/1984 | Japan . |
| 61-220793 | 10/1986 | Japan . |
| 63039696 | 2/1988 | Japan . |
| 63-091194 | 4/1988 | Japan . |
| 02052089 | 2/1990 | Japan . |
| 9405602 | 5/1995 | South Africa . |
| 8505584 | 5/1987 | Sweden . |
| 715493 | 2/1980 | U.S.S.R. . |
| 1412232 | 9/1990 | U.S.S.R. . |
| 1786008 | 1/1993 | U.S.S.R. . |
| 8501280 | 9/1983 | WIPO . |
| 9104949 | 9/1989 | WIPO . |

Primary Examiner—Elizabeth McKane
Assistant Examiner—Fariborz Moazzam
Attorney, Agent, or Firm—Killworth, Gottman, Hagan & Schaeff, LLP

[57] ABSTRACT

The invention provides for the treatment of raw water having a pH of 2.5 to 9, an alkalinity of at most 50 mg/l expressed as calcium carbonate, a calcium content of at most 100 mg/l expressed as calcium carbonate, and a positive calcium carbonate dissolution potential. The process comprises separating part of the water from the remainder thereof and acidifying the part to increase its calcium carbonate dissolution potential. The acidified water is then fed through a bed of particles comprising calcium carbonate where the water consumes part of the calcium carbonate thereby increasing the calcium content and the alkalinity of the water which issues from the bed. The water issuing from the bed is then mixed with the remainder of the raw water to obtain an at least partially treated product water having a positive calcium carbonate dissolution potential which is at least 2 mg/l calcium carbonate less than that of the raw water.

13 Claims, 3 Drawing Sheets

STABILIZATION OF WATER

BACKGROUND TO THE INVENTION

THIS INVENTION relates to the stabilization of water. More particularly, the invention relates to a process for the partial or total stabilization of water, which may be potable water or non-potable water intended for industrial, agricultural or other use.

SUMMARY OF THE INVENTION

According to the invention there is provided a process for the stabilization of raw water having a pH of 2,5–9, an Alkalinity of at most 150 mg/l expressed as calcium carbonate, a calcium content of at most 100 mg/l expressed as calcium carbonate, and a positive calcium carbonate dissolution potential, the process comprising:

separating part of the water from the remainder thereof and acidifying said part to increase its calcium carbonate dissolution potential;

feeding the acidified water through a bed of particles comprising calcium carbonate where said water consumes part of the calcium carbonate of the particles before issuing from the bed, which consumption is associated with an increase in the calcium content of the water and with an increase in the Alkalinity of the water as it passes through the bed; and mixing water issuing from the bed with the remainder of the raw water, thereby to obtain a product water having a positive calcium carbonate dissolution potential which is at least 2 mg/l calcium carbonate less than that of the raw water, and is at least partially stabilized.

By stabilized water is meant broadly a water where the chemistry is such that the water has a calcium carbonate precipitation potential of between 0 mg/l and 5 mg/l at ambient temperature, and where the water is stable with regard to gaseous and aqueous carbonate species.

Usually the acidified part will be fed in an upflow manner through the bed of particles.

By calcium carbonate dissolution potential of a water is meant mass in mg of calcium carbonate which must be dissolved in a litre of the water to saturate the water with regard to dissolved calcium carbonate, and it is expressed as mg/l calcium carbonate or mg/l $CaCO_3$.

Preferably sufficient calcium carbonate from the particles is consumed to reduce said dissolution potential of the product water to as low a value as possible, e.g. between 10 mg/l of $CaCO_3$ and 0 mg/l of $CaCO_3$, and typically to about 2 mg/l $CaCO_3$, partially to stabilise the water. Usually, the raw water will have a dissolution potential of at least 10 mg/l $CaCO_3$. In other words, sufficient calcium carbonate from the particles may be consumed to obtain, after mixing of the water issuing from the bed with the remainder of the water, the product water having a calcium carbonate dissolution potential of between 0 mg/l calcium carbonate and 10 mg/l calcium carbonate, or indeed less, so that the dissolution potential can be negative.

It follows that the dissolution potential may thus be reduced to a value less than 0 mg/l $CaCO_3$, ie a positive precipitation potential is created. Accordingly, sufficient calcium carbonate from the particles may be consumed to obtain a product water having a positive precipitation potential of 0–5 mg/l calcium carbonate in the water, thereby to stabilize the water fully.

By Alkalinity (also known as total alkalinity) is meant the total concentration, expressed in mg/l as calcium carbonate ($CaCO_3$) in the water, of dissolved $CO_3^{2-}$, $HCO_3^-$ and $OH^-$ ions, less the concentration of dissolved $H^+$ ions. This can be expressed by:

Alkalinity (mg/l as $CaCO_3$)=$CO_3^{2-}$+$HCO_3^-$+$OH^-$−$H^+$.

When water is partially stabilized, it becomes less aggressive to cementitious conduits, containers and structures and less corrosive with regard to metals. When water is fully stabilized it is non-aggressive and will not attack cementitious concrete, and it is significantly less corrosive with regard to most metals. A fully stabilized water is slightly supersaturated with regard to calcium carbonate.

By potable water is meant a water having the properties set forth in the following Table:

TABLE

| Properties | Units | Values | Typical Values |
|---|---|---|---|
| pH | pH units | 4.0–9.5 | 4.5–8.0 |
| conductivity | mS/m | ≦300 | 5–70 |
| magnesium content | mg/l as Mg | ≦100 | 5–70 |
| calcium content | mg/l as Ca | ≦300 | 1–50 |
| sodium content | mg/l as Na | ≦400 | 1–100 |
| chloride content | mg/l as Cl | ≦600 | 1–250 |
| sulphate content | mg/l as $SO_3$ | ≦600 | 1–200 |

Non-potable water, correspondingly, is water having one or more of the properties set forth in the above Table falling outside the specified limits given therefor in the Table.

Said part of the water, prior to its being fed to the bed, will be acidified in a fashion which leaves its potability or other potential use following subsequent blending substantially unaffected and which increases the rate at which it can consume the calcium carbonate of the particles. Thus, for potable water, a liquid solution of an acid such as hydrochloric acid, sulphuric acid, citric acid or the like may be dosed into said part of the water in quantities that are non-toxic, or preferably an acidifying gas such as carbon dioxide may be fed into said part of the water. The acidification may take place under pressure, the pressure typically being 100–300 KPa. The process may take place in a vessel specifically provided for the purpose of bringing the acid into contact with said part of the water, in an extended length of pipe or conduit, in a static mixer or indeed in any suitable vessel, before the acidified part enters the bed of particles comprising calcium carbonate. The bed of calcium carbonate may also be under pressure, eg 100–300 KPa, ie the water which is fed through the bed may be subjected in the bed to a pressure of 100–300 KPa. Acidification will take place to a degree such that the calcium carbonate dissolution potential is generally markedly increased and such that the pH of the water entering the bed is preferably at most 6, usually 2–6 and more typically 3–5. Accordingly, the process may include, prior to its being fed through the bed, acidifying said part of the raw water, the acidification acting to increase the calcium carbonate dissolution potential of the water sufficiently for the water being fed through the bed to enter the bed at a pH of ≦6. More specifically, the acidifying may be by feeding carbon dioxide into said part of the water at a pressure of 100–300 kPa, the acidified part of the water being fed in an upflow direction through the bed of particles.

The feeding of the acidified water through the bed typically causes the pH of the water to be raised together with the Alkalinity and the calcium content, while the Acidity remains unchanged, such that the calcium carbonate dissolution potential is reduced to a value of between +300 and −300 mg/l $CaCO_3$, preferably about +100 mg/l $CaCO_3$ in the stabilized water after the mixing step.

By Acidity (also known as total acidity) is meant the total concentration, expressed in mg/l as $CaCO_3$ in the water, of $H_2CO_3{}^*$, and of dissolved $HCO_3{}^-$ and $H^+$ ions, less the concentration of dissolved $OH^-$ ions in the water, where $H_2CO_3{}^*$ is the concentration of dissolved $H_2CO_3$ in the water together with the concentration of dissolved $CO_2$ in the water. In the water, this can be expressed by:

Acidity (mg/l as $CaCO_3$)=$H_2CO_3{}^*$+$HCO_3{}^-$+$H^+$−$OH^-$ where $H_2CO_3{}^*$=$H_2CO_3$+$CO_2$.

The bed of particles will typically be contained in a container which may be a pressurised container. Preferably, when the container is a pressurised container, $CO_2$ is used as an acidifying medium. As the acidified part of the water passes upwardly through the bed it will consume calcium carbonate in the particles by reacting with it and/or dissolving it, while releasing insoluble and inert fines from the particles. The calcium carbonate may be associated with magnesium carbonate, which will similarly be dissolved, and the particles may thus be limestone or dolomite particles. Particle make-up will be introduced to the bed intermittently or continuously, as required, to maintain the solids inventory of the bed at a desired level.

The solids feed to the bed may have a particle size of 1–25 mm, preferably 5–15 mm.

The container may have a perforated distributor panel on which particles of the bed are supported, and through which the acidified part of the water passes upwardly into the bed. The distribution panel will have perforations therein, eg holes of a diameter of 2–6 mm or slots of a width of 2–6 mm; the total area of the perforations and the water feed rate of the acidified part of the water being selected so that said insoluble fines, such as silica fines, can, while water is flowing upwardly through the perforations, gravitate downwardly through the bed and perforations to a position below the plate. In a particular construction the plate may form the roof of a distribution chamber having an inlet into which the acidified part of the water is fed and from which said fines are flushed, for example intermittently, as required. The distribution chamber may be flat-bottomed, downwardly domed or inverted conical, having a closable low-level flushing outlet, via which the fines are flushed from the chamber by said acidified part of the water as it is fed into the inlet, typically at an increased rate relative to the feed rate when no flushing takes place.

The container preferably has a header space, unoccupied by particles, above the bed, from which said part of the water, being partially-, fully- or supersaturated with calcium carbonate, is withdrawn, for example via a launder or manifold located in the header space.

The water passing through the bed may be recirculated after it has passed through the bed. Accordingly, the process may include recirculating a portion of the water issuing from the bed through the bed, thereby increasing water flow rate through the bed relative to nett raw water feed rate to the bed. Thus, a proportion of the water passing upwardly through the bed may be recirculated from the header space to the distribution chamber for increasing the water flow rate through the bed relative to the nett water feed rate to the bed, and for increasing the degree of stabilization which the water so fed undergoes. The ratio between the rate of water recirculation and the nett raw water feed rate to the bed may be 1:1–20:1. In other words, the ratio between the rate of water recirculation from the header space to the distribution chamber and the rate of nett raw water feed to the bed (ie recycle:feed ratio) may be from 1:1–20:1, typically 2:1–10:1.

The reintroduction of said part of the water, after it has passed through the bed, into the remainder of the water, eg via a static mixer, results in a product water which may be partially-, totally- or excessively stabilized with regard to calcium carbonate. The degree of stabilization achieved will be dependent upon the initial raw water quality, the mass ratio between said part and remainder of the water, the type and quantity of the acid introduced into said part of the water and the pressure in the container (the pressure being of increased importance to the process when an acidifying gas such as carbon dioxide is employed).

When the product water obtained after said reintroduction contains an excessive amount of dissolved $CO_2$, which is usually the case unless there is an extremely long residence time for the acidified water in the bed of particles, which can depress the pH and render the water unsaturated with regard to $CaCO_3$, the process may include stripping of some of the $CO_2$ from the water. More particularly, the process may include stripping of $CO_2$ from the water issuing from the bed, eg by means of aeration, such as by passing said water over a cascade or by spraying said water through aeration nozzles, the stripping being to an extent such that the amount of $CO_2$ remaining dissolved in the product water exceeds, by no more than 5%, the amount of $CO_2$ dissolved in the water in equilibrium with the atmosphere. This stripping can take place after the mixing step or, as described hereunder, before the mixing step. The amount of $CO_2$ dissolved in the water in equilibrium with the atmosphere will vary depending on ambient conditions, such as variations in pressure and temperature. The aeration of the product water may be such that $CO_2$ exchange between the product water and the atmosphere takes place until the respective $CO_2$ partial pressures in the water and the atmosphere are close to equilibrium, eg substantially equal. Such stripping will increase the pH and decrease the Acidity of the water. The product water may then further be treated to obtain the required degree of stabilization by dosing with an alkali, such as one or more of calcium hydroxide, sodium hydroxide or sodium carbonate. Said dosing assists in achieving the desired levels of pH, total alkalinity and calcium content. The alkali dosing may be such that a positive calcium carbonate precipitation potential is achieved. The dosing may be such that the pH of the dosed water is 8–9.5.

By calcium carbonate precipitation potential is meant the mass in mg of calcium carbonate which will naturally precipitate from a litre of water over a period of time thereby reducing it from a state of supersaturation to a state of saturation with regard to dissolved calcium carbonate, and is expressed as mg/l $CaCO_3$.

Naturally, if desired, said part of the water may be passed as described above in series through a plurality of said particle beds, in the same or separate containers, arranged in series. The above described water recirculation and/or acidification may be carried out individually on each bed; or the recirculation may take place from the header space of the final bed to the distribution chamber of the first bed, the acidification taking place only prior to the first bed; and hybrids of the aforegoing are naturally possible.

In another embodiment of the process, the water issuing from the bed may be stripped of excess $CO_2$, eg by cascading or spraying this water, before the mixing step, in a closed container under a vacuum, eg at a pressure of −6,7 to −20 kPa gauge pressure (50–150 mmHg) at typically 20° C., the stripped water accumulating in the lower part of the container. The stripped water may then be displaced or discharged from the container by pumping or by siphoning under gravity. Recovered $CO_2$ gas (as well as any water vapour and air present) stripped from the water may be recirculated back to the acidification vessel where it is reintroduced under pressure to augment the acidifying $CO_2$ gas being fed into the part of the water. Alternatively, said recirculated $CO_2$ gas (as well as any water vapour and air present) stripped from the water may be recirculated back to a separate acidification vessel, upstream of the acidification vessel, through which said part of the water passes, for this purpose. Accordingly, the stripping may be carried out before the water issuing from the bed is mixed with the remainder of the raw water, the stripping being selected from cascading and spraying the water in a closed container at a pressure of −6,7 to −20 kPa gauge pressure (50–150 mmHg) at typically 20° C., to form stripped water, the method further including using $CO_2$ gas stripped from said water at least partially to acidify the part of the raw water which is passed through the bed of calcium carbonate particles, before said part is passed through the bed. The vacuum in the container may be obtained by means of a mechanical vacuum pump, eg a water pump or a compressor-type vacuum pump, the gas to be recirculated being compressed by the same pump. The $CO_2$ gas (as well as any water vapour and air present) may further be purified by passing the $CO_2$ gas (as well as any water vapour and air present) through a $CO_2$ purification means, such as a $CO_2$ separation membrane unit or a pressure swing absorption unit, to separate the $CO_2$ gas from any water vapour and air present, before the $CO_2$ is recirculated under pressure back to the acidification vessel.

As mentioned above, the process may include, as a final process step, dosing the product water with an alkali to obtain a desired degree of stabilization thereof, the alkali dosing being such that a positive calcium carbonate precipitation potential is achieved, and a pH of the dosed water of typically 8–9,5 is achieved.

In the case of unpressurized fixed bed, circular-cylindrical containers having a relatively slender aspect may be employed, with a height:diameter ratio of 1:1–4:1, preferably 1.8:1–3:1, although, naturally, containers of differing horizontal cross-sectional outlines, eg rectangular, may be used, employing the same height:cross-sectional area ratio as for cylindrical containers. Regardless of overall container height, the header space will typically have a height 0.2–1 m, typically 0.2–0.4 m.

In the case of pressurized beds said container height (neglecting the depth of the upper end which will typically be domed) will usually be somewhat less, the height:diameter ratio for circular cylindrical vessels being 1:1–3:1 and preferably 1.4:1–2.3:1, with similar height:horizontal cross-sectional area ratios for containers of non-circular horizontal cross-section. The feeding of the water through the bed may be at a rate such that the average residence time in the bed of the water fed through the bed is 1–30 minutes. In each case, ie unpressurized or pressurized fixed beds, the residence or contact time, ie the time which the water flowing through the bed spends in contact with the particles of the bed, may be 1–30 minutes, typically 2–10 minutes, although this will naturally depend on the quality (primarily pH,total alkalinity and carbonate ion content) of the raw water, the degree of water circulation carried out on said part, the degree of acidification thereof, etc.

As the quality of raw water can vary from place to place and from time to time, the various parameters specified above, and container dimensions and the like, should be employed as a guide, and routine experimentation should be used to optimize these parameters or at least establish an acceptable set of parameters, bearing practical and economic considerations in mind.

BRIEF DESCRIPTION OF THE DRAWINGS

The invention will now be described, by way of example, with reference to the accompanying diagrammatic drawings, in which.

DETAILED DESCRIPTION

Figure 1:
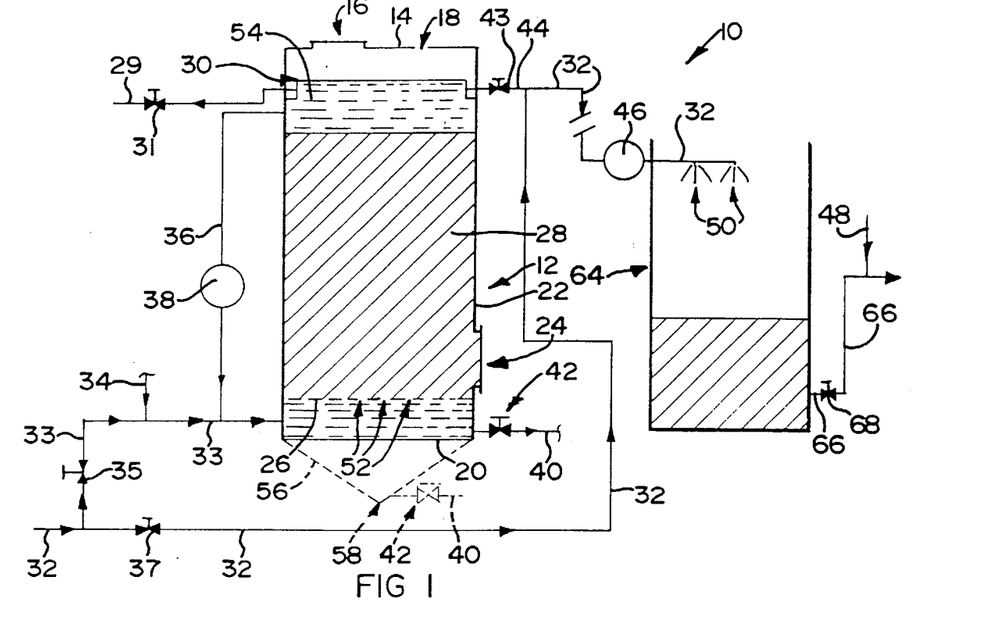
FIG. 1 shows a schematic sectional side elevation of an apparatus or installation for carrying out an unpressurized fixed-bed version of the process of the present invention.

In FIG. 1 of the drawings, reference numeral 10 generally designates an apparatus for carrying out the process of the present invention. The apparatus 10 comprises a circular-cylindrical container in the form of a slender vessel 12 having a height:diameter ratio of 1.6:0.6. The vessel 12 is mounted in an upright position and has a flat horizontal lid 14 provided with a manhole 16 and a vent opening 18. The vessel 12 further has a flat horizontal floor 20 and a vertically extending cylindrical side wall 22 provided with a porthole 24.

A perforated distributor panel 26 forms a horizontal partition in the interior, spaced above the floor 20, the floor 20 and panel 26 defining a distribution chamber therebetween. A fixed bed 28 of limestone particles having a particle size of at most 25 mm is supported on the panel 26, the bed 28 having a height such that a header space is left free of particles, above the bed 28 and below the lid 14. An annular launder 30 is mounted in the header space. A fines discharge line 29, provided with a shut-off valve 31, issues from the launder 30.

A raw water feed line 32 from a raw water source (not shown) bypasses the vessel 12, but a branch line 33, branching from line 32, is shown feeding into the distribution chamber, while an acid dosing line 34 from an acid source (not shown) in turn feeds into the line 33. An optional water recirculation line 36 provided with a pump 38 feeds from the header space at a level below the launder 30 into the line 33, at a position downstream, relative to flow along the line 33, from the feed of the line 34 into the line 33. Flow lines 32 and 33 are respectively provided with flow regulation valves 37 and 35. A flushing line 40, provided with a shut-off valve 42, issues from the distribution chamber at a low level, adjacent the floor 20.

A discharge flow line 44, provided with a shut-off valve 43, issues from the launder 30 through the wall 22 and enters line 32. The line 32 is provided with a pump 46 downstream of where the line 44 enters the line 32, and, downstream of the pump 46, with a plurality of aeration nozzles 50, feeding into a storage vessel 64. The vessel 64 has a discharge flow line 66 provided with a shut-off valve 68. An alkali dosing line 48 feeds from an alkali source (not shown) into the line 66. The line 66 feeds into a stabilized product water reservoir (not shown).

The panel 26 has a plurality of perforations 52 in the form of circular holes of a diameter 4 mm evenly distributed over its surface and in total making up 20% of its area.

In accordance with the process of the present invention and with reference to FIG. 1, potable raw water is diverted from flow line 32 into flow line 33 and fed into the distribution chamber from which it passes upwardly through the perforations 52 into the bed 28, up which it percolates. The valve 43 in flow line 44 is closed initially and the valve 31 in line 29 is opened so that any suspended limestone fines are initially flushed through discharge line 29 to waste. Raw water is thus fed into the distribution chamber and discharged via flow line 29 to waste until the discharged water is clear. The valve 31 is then closed and valve 43 is opened for normal operation. The flushing step is generally only required when the vessel 12 is initially filled with limestone particles or when additional limestone particles are subsequently charged into the vessel 12 to maintain the height of the bed 28.

The feed rate of the raw water and rate of any water recirculation, if required, (described hereunder) are selected so that water entering the bed from the plate 26 spends a desired contact time in contact with the particles of the bed until it enters the header space. The upward water flow rate and the total area of the perforations 52 are selected so that silicate fines and other insoluble fines from the bed 28, which gravitate downwardly through the bed 28, will gravitate down through the perforations 52 into the distribution chamber, where they settle on its floor 20.

The launder 30 causes a layer 54 of water to form in the header space on top of the bed 28, up to the level of the launder 30, and the pump 38 recirculates water along flow line 36 from the layer 54 into the flow line 33 at a selected recycle:raw water flow rate ratio. Dosing of acid along flow line 34 into raw water in the flow line 33 upstream of where the flow line 36 enters the flow line 33, takes place at a rate selected to reduce the pH of the water entering the distribution chamber, to a desired level.

Water issues from the vessel 12 along flow line 44 and mixes into water in flow line 32 where it mixes or blends with the water flowing along the flow line 32. The water flowing along flow line 32 can then, if desired, be pumped by pump 46 through the aeration nozzles 50 where it is aerated and its dissolved carbon dioxide content is reduced. The aerated water issues from the nozzles 50 and is collected in the vessel 64. Dosing, of sodium carbonate or calcium hydroxide into the flow line 66, takes place downstream of the vessel 64, along flow line 48, which dosing increases the pH of the water, while increasing the Alkalinity and the calcium content (if calcium hydroxide is used). However, for the potable raw water in question, this would not normally be required.

From time to time, as required, limestone particles of a particle size of 1–25 mm are charged into the header space via manhole 16 to maintain the height of the bed 28; and, similarly, the valve 42 is opened from time to time, while the feed rate of water along flow line 33 is increased, to flush accumulated fines in the distribution chamber out of this chamber along flow line 40 to waste. Furthermore, from time to time, the feed of water along line 33 is stopped, valve 42 is opened and water in the bed 28 is allowed to drain to waste via line 40, to flush accumulated insoluble fines in the bed 28 to waste.

In the bed the upflowing water reacts with and dissolves the limestone particles so that their size is progressively reduced until only insoluble fines remain, while the pH, total alkalinity and calcium ion content of the water increases. The water is discharged via line 44 into the line 32 which results in the product water's being partially or fully stabilised with regard to calcium carbonate. The acid dosing acts, by reducing the pH of water entering the bed 28, to accelerate this consumption, and the alkali dosing via line 48 acts to increase the pH and alkalinity of the product water in a manner such that a desired calcium carbonate precipitation potential of 1–5 mg/l as $CaCO_3$ is attained.

Naturally, the flow rates of the water flowing in the flow lines 32 and 33 can be controlled or regulated by means of the flow regulation valves 37 and 35 respectively.

With regard to the dimensions of the vessel 12, the height of the vessel, for the purpose of the above height:diameter ratio, is the spacing between the panel 26 and the lid 14 (1.6 m). The height of the header space between the top of the bed 28 and top edge of the launder 30, ie the depth of the water 54 above the bed, is 0.3 m, and the lid 14 is about 0.2 m above the level at which the water 54 is kept by the launder 30.

As a variation of the apparatus 10 of FIG. 1, the flat floor 20 can be replaced by an inverted conical floor 56 (shown in broken lines), the line 40 issuing from the distribution chamber at or adjacent the downwardly directed apex 58 of the conical floor 56, which feature can facilitate fines flushing. Raw water, acid and alkali can be fed by pumping or by gravity, as desired.

Figure 2:
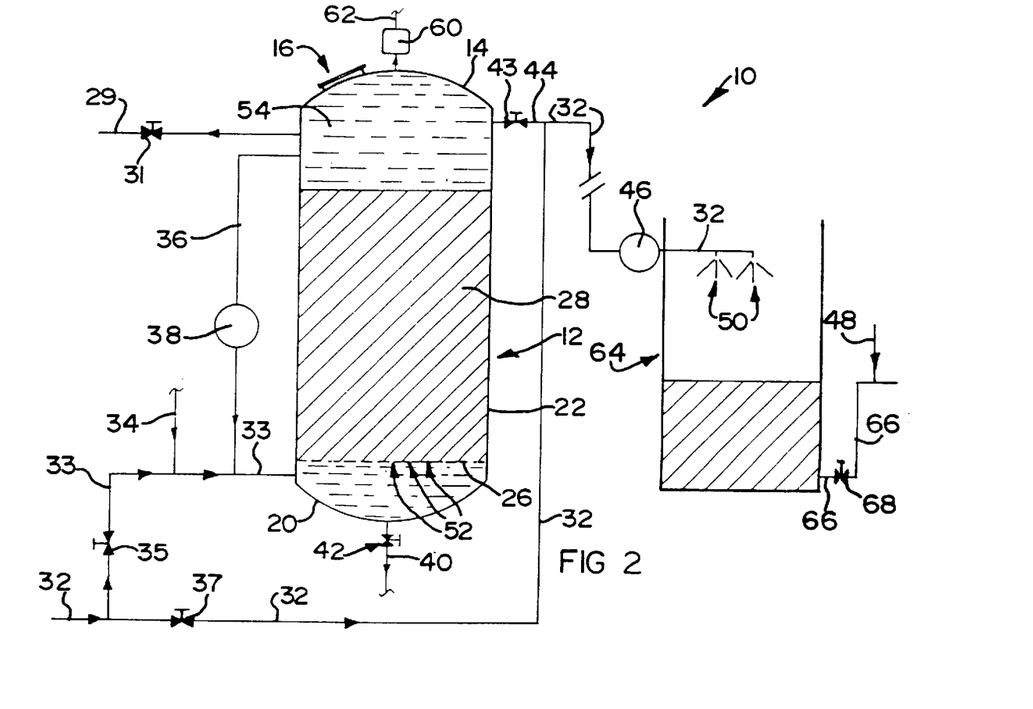
FIG. 2 shows a similar view of another said apparatus or installation for carrying out a pressurized fixed-bed version of said process.

Turning to FIG. 2, the same reference numerals are used to designate the same parts as in FIG. 1, unless otherwise specified. The primary difference between the vessel 12 of FIG. 2 and that of FIG. 1 is that the vessel 12 of FIG. 2 is a pressure vessel, having outwardly domed or dished ends forming a roof, designated 14, and a floor, designated 20. The launder 30 and porthole 24 of FIG. 1 are omitted from FIG. 2, and a gas pressure relief valve 60 is provided in a gas relief line 62 issuing from the top of the roof 14. The height:diameter ratio in FIG. 2, of the vessel 12, is 1.8:1 but can vary in the range 1.4:1–2.3:1, the height being the spacing between the panel 26 and the top of the roof 14; and the header space has a depth from the top of the bed 28 to the top of the roof 14 of 0.4 m, although this can vary over the range 0.3–0.5 m. The lines 29 and 44 issue directly from the wall 22 of the vessel in the header space, in the absence of a launder (see 30 in FIG. 1), as does the line 36.

The process of the method of the present invention, when carried out with the apparatus 10 of FIG. 2, is essentially similar to that described above with reference to FIG. 1, with the primary difference that the vessel is closed and is pressurized to a pressure of 100–250 KPa. The increased pressure increases the rate at which the limestone particles are consumed so that the vessel height and the bed depth can be reduced relative to those of FIG. 1, for the same vessel diameter and/or increased flow rates can be employed.

Figure 3:
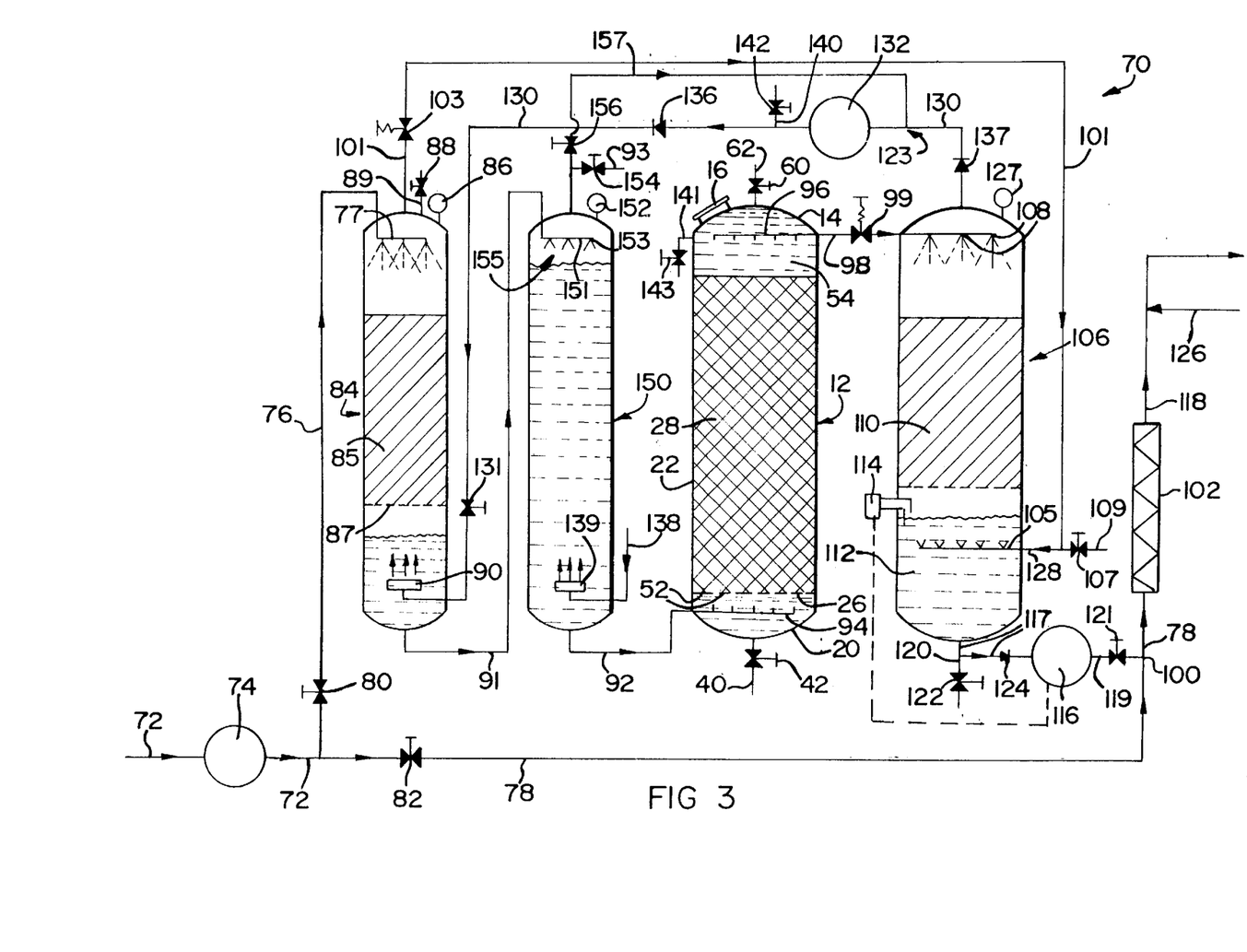
FIG. 3 shows a similar view of a yet further apparatus or installation for carrying out a pressurized fixed-bed version of said process using $CO_2$ gas as an acidifying medium and, with $CO_2$ recovery by means of spraying water containing $CO_2$ into a vessel under vacuum and recycling $CO_2$ recovered from the water by means of a compressor-type vacuum pump.

Turning to FIG. 3, the same reference numerals are used to designate the same parts as in FIGS. 1 and 2, unless otherwise specified. Reference numeral 70 generally designates a variation of the apparatus of FIG. 1 for carrying out the process of the invention. A raw water feed line 72 is shown feeding through a pressurising pump 74. The feed line 72 branches into flow lines 76 and 78. The flow lines 76 and 78 are provided with flow regulation valves 80 and 82 respectively. The flow line 76 feeds into a pressure vessel 84 via spray nozzles 77, the vessel 84 being provided with a pressure gauge 86. A pressure outlet valve 88 is provided in a gas relief line 89 issuing from the vessel 84. The vessel 84 contains packing material 85 supported on a perforated distributor panel 87. The vessel 84 has a gas discharge flow line 101 provided with a pressure regulator valve 103. A liquid discharge flow line 91 issues from the bottom of the vessel 84 and feeds into another pressure vessel 150 through a liquid distribution manifold 151 which is provided with spray nozzles 153. The vessel 150 is except for water in use essentially empty and contains no packing material, but is provided with a sparger 139. A carbon dioxide feed line 138 feeds into the sparger 139. The vessel 150 is shown having a header space designated by reference numeral 155 in which the manifold 151 is located. The vessel 150 is also provided with a pressure gage 152 and a gas discharge flow line 157 issues from the top of the vessel 150, a branch line 93 branching from the line 157. The branch line 93 is provided with a flow regulation valve 154 and the flow line 157 is provided with a flow regulation valve 156.

An acidified feed discharge flow line 92 issues from the vessel 150 and enters the vessel 12 through an optional distribution manifold 94. The vessel 12 is essentially identical to the vessel 12 of FIG. 2, unless otherwise specified, and the same reference numerals are used to designate the same parts as in FIG. 2. The vessel 12 is provided with a fines discharge line 141, the line 141 having a flushing valve 143. An optional collecting manifold 96 is shown in the header space and discharging from the vessel 12 along flow line 98, which flow line 98 feeds via a pressure/flow regulator 99 into a carbon dioxide vacuum stripping unit 106 through a plurality of spray nozzles 108. The unit 106 is provided with a layer of packing material 110 in the form of Pall rings or Raschig rings. Water 112 stripped of gas ($CO_2$) is shown accumulated in the bottom of the unit 106. A level controller 114 for controlling the level of the water 112 is shown operatively connected (broken line) to a pump 116.

A water discharge flow line 117 issues from the lower end of the unit 106 and the flow line 117 is provided with a drain line 120, the drain line 120 having a drain valve 122. The flow line 117 feeds through a non-return valve 124 into the pump 116. A flow line 119 issues from the pump 116 and, after feeding through a control valve 121, enters the flow line 78 at a blending point 100. From the blending point 100, the flow line 78 feeds into an optional static mixer 102. A mixed water flow line 118 issues from the static mixer 102. A pH measuring probe (not shown) is provided in the flow line 118. An alkali dosing line 126 feeds from an alkali source (not shown) into the flow line 118, downstream from the mixer 102.

The unit 106 is provided with a vacuum gauge 127. A vacuum line 130 issues from the top of the unit 106, the line 130 having a non-return valve 137 and being connected to a blower- or compressor-type vacuum pump 132. The line 130 feeds from the pump 132 through a non-return valve 136 and a pressure control valve 131 into the vessel 84 via the sparger 90. An air vent line 140 having an air vent control valve 142 branches from the flow line 130 between the non-return valve 136 and the pump 132. The line 157 issuing from the vessel 150 feeds through the flow regulating valve 156 into the line 130 at a position 123 between the pump 132 and the non-return valve 137. The flow line 101 feeding from the vessel 84 branches into flow lines 109 and 128. The flow line 109 is provided with a flow regulation valve 107 and the flow line 128 feeds into a distribution manifold 105 in the unit 106 below the level of the water 112.

In accordance with the process of the invention and with reference to FIG. 3, potable raw water, typically having a low pH of 4.5–6.5, a low calcium content of 2–5 mg/l (as $CaCO_3$) and low alkalinity of 2–5 mg/l (as $CaCO_3$) is fed along flow line 72 at a pressure of 200–300 KPa through the pump 74, the pump 74 being used to increase the pressure of the water if necessary, into flow lines 76 and 78 respectively. Flow, at a pressure eg of approximately 300 KPa, along flow line 76 is controlled by the valve 80, this flow comprising approximately 3–5% of the total flow along line 72. Flow, at a pressure of eg approximately 250 kPa (ie less than that of the flow along flow line 76) along flow line 78 is controlled by the valve 82, this flow comprising 95–97% of the total flow along line 72. The flow along the flow line 78 may instead be left unrestricted and a pump (not shown) may be provided in the flow line 76 to increase the pressure in the flow line 76 to a value higher than that in the flow in flow line 78, typically 50–100 KPa higher.

The potable raw water enters the vessel 84 via flow line 76 at its upper end via the spray nozzles 77 and is sprayed on to the packing material 85. The water flows downwardly through the packing material 85 before exiting at the bottom of the vessel 84 into flow line 91. $CO_2$ gas (mixed with air recovered from the vessel 106), at a pressure slightly in excess of the pressure in the vessel 84, is fed to the sparger 90 via flow line 130, which $CO_2$ gas/air mixture rises upwardly through the water in the vessel 84 and dissolves in the water (more specifically in water films which form on the packing material 85 as the water flows downwardly therethrough). A counter-current gas mixture/water flow is therefore obtained in the vessel 84. Any undissolved carbon dioxide (and any water vapour and air present) issuing along line 101 from the top of the vessel 84 is fed back to the carbon dioxide vacuum stripping unit 106 through the manifold 105 via the flow line 101, the flow being controlled by the pressure regulator 103. Residual air trapped in the various parts or components of the apparatus 70 aids in or enhances the $CO_2$ stripping process. Additional air, if required, is fed into the stripping unit 106 through line 109 and controlled by means of the valve 107, to assist in the stripping of carbon dioxide. Alternatively, co-current operation can be employed if the configuration and layout of the apparatus 70 is altered somewhat, eg the recovered $CO_2$ can be fed along line 130 directly into the bottom of the vessel 12, allowing dissolution of $CO_2$ into the water while the $CO_2$ and water are passing upwardly through the calcium carbonate bed in the vessel 12.

Initially $CO_2$ gas is supplied from the $CO_2$ supply (not shown) and fed into the vessel 150 via the feed line 138 and the sparger 139 until the water issuing from the process reaches a predetermined or desired level of stabilization. During filling of the vessel 150, air is vented to atmosphere through line 93, the venting being controlled by the valve 154. Once said desired stabilization is achieved, as mentioned above, $CO_2$ recovered from the unit 106 (and any water vapour and air present) can be fed to the sparger 90, the $CO_2$ flow being controlled by the valve 131 along flow line 130. Any residual air as well as any undissolved $CO_2$ remaining after passing up the vessel 84 is discharged from the vessel 84 via feed line 101 through the pressure control valve 103 and is reintroduced into the $CO_2$ recovery vessel 106 through the distribution manifold 105. Additional $CO_2$, as required, is supplied via flow line 138 from the $CO_2$ supply into the vessel 150. The vessel 150 is generally operated such that little or no excess $CO_2$ accumulates in the header space 155, in the header space 155. If excess $CO_2$ accumulates in the header space 155, the $CO_2$ flow into the vessel 150 via line 138 is reduced. Any excess accumulated $CO_2$ in the header space 155 is fed via flow line 157 back into the flow line 130.

The acidified water, generally having a pH of 4–5, containing carbonic acid and dissolved carbon dioxide, passes from the vessel 150 along flow line 92 through the manifold 94 into the bottom of the vessel 12 and passes through the calcium carbonate contained therein. The calcium carbonate reacts with the acidified water taking a high concentration of calcium bicarbonate into solution. The contact time or retention time of the water in the vessel 12 is typically 5–15 minutes. The treated water discharged from the vessel 12, after contact, typically has a pH of 5.5–6.5, a calcium content of 800–1000 mg/l (as $CaCO_3$) and an alkalinity of 800–1000 mg/l (as $CaCO_3$). The treated water has an acidity of 6000–9000 mg/l (as $CaCO_3$) and a $CaCO_3$ dissolution potential of 100–300 mg/l. In this state, the water is stable as long as the pH remains below 8.

Calcium-enriched water passes from the water layer 54 through the manifold 96 into flow line 98 and feeds through the pressure control valve 99 into the unit 106 through the spray nozzles 108. When the calcium enriched water is sprayed into the unit 106 through the spray nozzles 108, which unit is partially evacuated (100–250 mmHg), dissolved $CO_2$ contained in the water being at least partially stripped from the spray droplets and from such thin films of water as form on the packing material 110 in the unit 106. The water accumulates in the lower part of the unit 106 as illustrated at 112 and this water is pumped out to storage through flow line 117 through the non-return valve 124 by means of the pump 116 (through the control valve 121) and enters the flow line 78 at the blending point 100. Alternatively, a gravity siphon (not shown) having an approximately 10 m minimum fall can be employed to draw water from the unit 106. The level controller 114 activates the pump 116 (or a solenoid valve opens if a gravity siphon is employed), thereby to pump water from the unit 106 to keep the water level within preset limits in the unit 106. The water discharged from the unit 106 typically has a pH of 6.5–8, a calcium content of 800–1000 mg/l (as $CaCO_3$), an alkalinity of 800–1000 mg/l (as $CaCO_3$), an acidity of 1000–3000 mg/l (as $CaCO_3$) and a $CaCO_3$ precipitation potential of −10 to +500 mg/l.

As mentioned above, the calcium enriched water issues from the vessel 106 along flow line 117 and is pumped by the pump 116 into the flow line 78 containing the main stream at the blending point 100. The water is mixed in the static mixer 102 and issues along flow line 118. The blended water typically has a pH of 5.5–7.0; a calcium content of 30–50 mg/l (as $CaCO_3$); an alkalinity of 30–50 mg/l (as $CaCO_3$); an acidity of 50–100 mg/l (as $CaCO_3$) and a $CaCO_3$ dissolution potential of 0.5–10 mg/l.

Product water which issues from the mixer 102 is nearly fully stabilised with respect to $CaCO_3$ and can be fully stabilised (ie zero dissolution potential) or can be adjusted to have a slightly positive precipitation potential, by the addition of a small quantity of alkali (sodium carbonate, calcium hydroxide, or sodium hydroxide) injected directly into the flow line 118 along flow line 126, the dosing being controlled by means of the pH probe.

As indicated above, the vacuum pump 132 withdraws $CO_2$ (and any water vapour and air present) from the unit 106 via line 130 and repressurises the $CO_2$ upstream of the control valve 131, the $CO_2$ (and any water vapour and air present) being fed into the vessel 84 through the sparger 90. The non-return valve 136 prevents any water from being drawn back into the vacuum pump 132.

Figure 4:
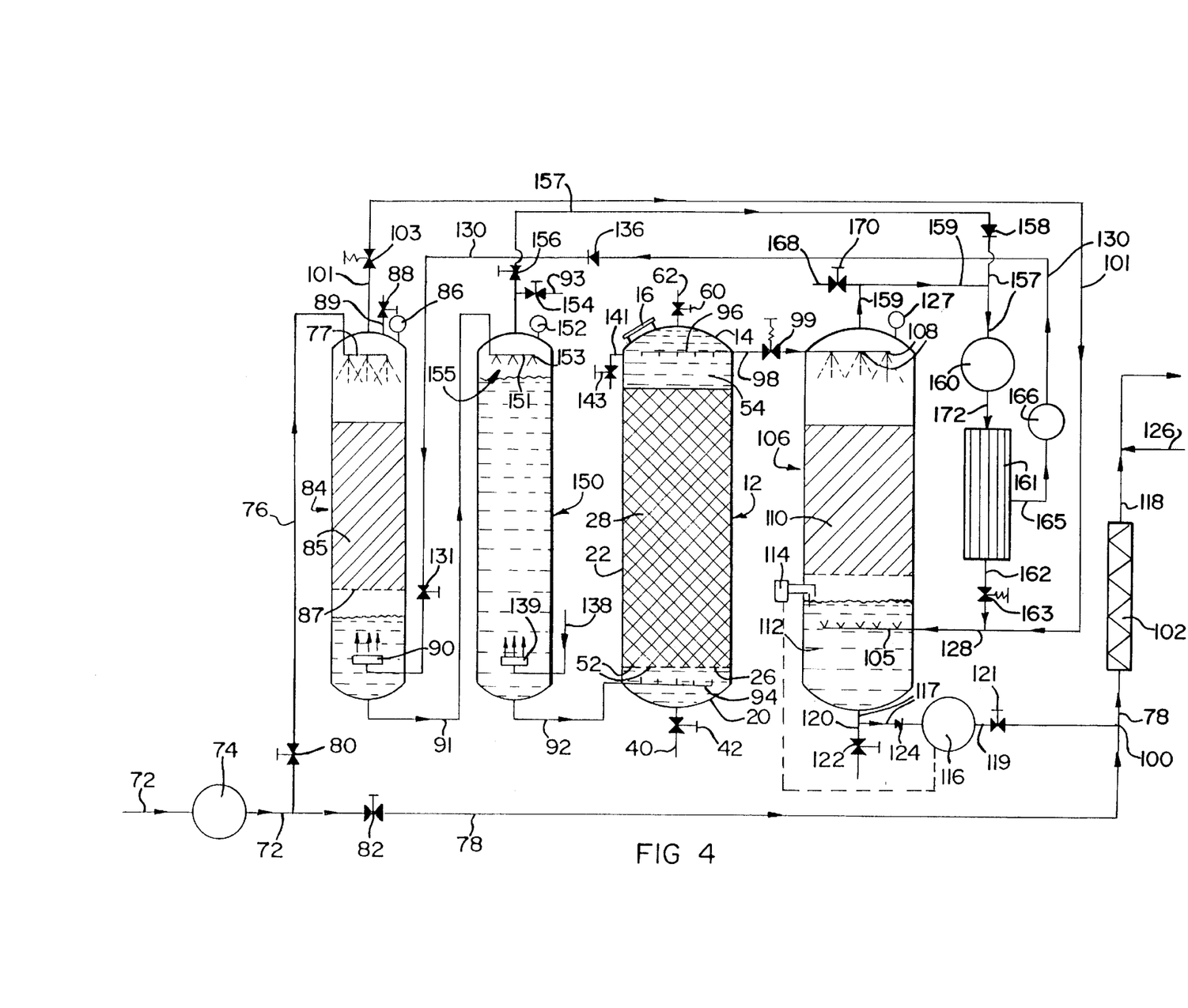
FIG. 4 shows a similar view of an apparatus as shown in FIG. 3, with $CO_2$ recovery being by means of a membrane gas separation unit.

Turning to FIG. 4 the same reference numerals are used to designate the same parts as in FIG. 3, unless otherwise specified. The primary difference between the apparatus 70 of FIG. 3 and that of FIG. 4 is that a flow line 159 replaces the line 130 issuing from the top of the vessel 106 and has a branch line 168. The branch line 168 is provided with a discharge valve 170. The flow line 157 from vessel 150 feeds through a non-return valve 158 into a compressor-type vacuum pump 160. The flow line 159 feeds into the flow line 157 at a point between the non-return valve 158 and the pump 160. A flow line 172 issues from the pump 160 into a membrane gas separation unit 161. An air/water vapour flow line 162 issues from the unit 161 through a pressure control valve 163 and feeds into the flow line 101, before the flow line 101 feeds into the distribution manifold 105 in the unit 106. A $CO_2$ flow line 165 issues from the unit 161 and feeds into a compressor-type vacuum pump 166 (which is of smaller capacity than the pump 160 and feeds into the line 130 in the fashion of pump 132 of FIG. 3). The flow line 130 issues from the pump 166, which flow line 130 then feeds into the sparger 90 via the non-return valve 136 and the control valve 131. Alternatively, in another embodiment, the flow line 101 can feed into the flow line 157 between the valve 158 and the pump 160.

The process of the present invention, when carried out with the apparatus 70 of FIG. 4, is essentially similar to that described above with reference to FIG. 3, the primary difference being that the vacuum pump 160 withdraws a gas mixture containing $CO_2$ stripped from the calcium enriched water in the unit 106 via the flow line 159, thereby creating a partial vacuum in the unit 106. The pump 160 recompresses the gas mixture ($CO_2$, air and water vapour) to a pressure of approximately 200–300 KPa before pumping the gas mixture into the membrane gas separation unit 161. In the membrane gas separation unit 161, $CO_2$ is separated from the gas mixture and is fed via flow line 165 into the pump 166. In other words, at least partially purified $CO_2$ issues from the unit 161 via feed line 165. The $CO_2$ issues from the unit 161 at a lower pressure than the remainder of the gas mixture which issues from the unit 161 along flow line 162. In the unit 161, the membrane allows $CO_2$ to pass therethrough while substantially preventing passage of other gases, e.g. nitrogen and/or oxygen, thereby separating the $CO_2$ from the other gases and water vapour being fed, together with the $CO_2$, into the unit 161.

Air, as well any $CO_2$ which does not dissolve in the water passing through the vessel 84, is returned via the flow line 101 to the stripping unit 106. $CO_2$ recovered from the unit 161 is returned via the flow line 130 back into the vessel 84 to acidify the water entering the vessel 84. The remainder of the gas mixture from which the $CO_2$ is separated passes through the unit 161 and, as mentioned above, issues via line 162 therefrom before passing through the pressure control valve 163, being then fed with the contents of flow line 101 into flow line 128 and then via the distribution manifold 105 into the unit 106. The gas mixture circulating in this manner assists with the stripping of the $CO_2$ from the water passing through the unit 106. If excess $CO_2$ accumulates in the header space 155 of the vessel 150, it is fed along flow line 157 into flow line 159 before entering the pump 160.

Optionally, in another embodiment of the invention, the membrane unit 161 can be replaced with a pressure swing adsorption (PSA) unit (not shown). The pressure swing adsorption unit can include two or more activated carbon containers. The containers are successively used by allowing the gas mixture ($CO_2$, air and water vapour) to flow through one of the containers charged to a pressure of 300–400 KPa while the other container or containers undergo discharging. The container being discharged is depressurised, venting any $CO_2$ adsorbed on the activated carbon into the line 130 thus acidifying the water in the vessel 84 as described above, while the gas mixture is passed through the next container under pressure, allowing the $CO_2$ in the gas mixture to be adsorbed on the carbon.

Advantages of the invention, particularly as described with reference to the drawings, are that by bringing the limestone into contact with only part of the raw water, a very high degree of calcium carbonate dissolution in said part can be achieved by acid dosing to a low pH level, resulting in supersaturation with regard to calcium carbonate. By reintroducing this supersaturated part back into the remainder, partial or total stabilization can be achieved. The final control of the degree of saturation can be attained by dosing of an alkali into the water after the reintroduction (eg by reduction of the dissolved carbon dioxide therein by aerating this water using sprayers specifically as illustrated in FIGS. 1 and 2). Pressurised operation and water recirculation both promote increased limestone consumption/dissolution rates and provision is made for flushing of insoluble fines to waste. Excess carbon dioxide used to promote the rapid dissolution of the calcium carbonate particles can be recovered and reused in the process, thereby reducing process costs. The use of limestone in the process in accordance with the invention is preferred as limestone is generally inexpensive compared to lime (calcium hydroxide) thereby further reducing process costs. The invention is believed to provide a practically feasible and economically attractive process, using straightforward apparatus, for upgrading waters, eg for municipal, agricultural and/or industrial use, which is stabilized to have reduced aggressiveness to cementitious structures and reduced corrosiveness to metal structures.

What is claimed is:

1. In a process for the treatment of raw water having a pH of 2.5–9, an Alkalinity of at most 150 mg/l expressed as calcium carbonate, a calcium content of at most 100 mg/l expressed as calcium carbonate, and a positive calcium carbonate dissolution potential, the process comprising feeding the water through a bed of particles comprising calcium carbonate where said water consumes part of the calcium carbonate of the particles before issuing from the bed, which consumption is associated with an increase in the calcium content of the water and with an increase in the Alkalinity of the water as it passes through the bed, the improvement which comprises, before the water is fed through the bed, separating part of the water from the remainder thereof and acidifying said part of the water, by dissolving carbon dioxide therein, thereby to increase its calcium carbonate dissolution potential, stripping carbon dioxide from the water issuing from the bed and, after said stripping of carbon dioxide therefrom, mixing water issuing from the bed with the remainder of the raw water, thereby to obtain a product water having a positive calcium carbonate dissolution potential which is at least 2 mg/l calcium carbonate less than the calcium carbonate dissolution potential of the raw water.

2. A process as claimed in claim 1, in which sufficient calcium carbonate from the particles is consumed to obtain a product water having a calcium carbonate dissolution potential of between −100 mg/l calcium carbonate and +600 mg/l calcium carbonate.

3. A process as claimed in claim 1, in which sufficient calcium carbonate from the particles is consumed to obtain a product water having a positive calcium carbonate precipitation potential of 0–5 mg/l calcium carbonate in the water.

4. A process as claimed in claim 1 in which the water which is fed through the bed is subjected in the bed to a pressure of 100–300 KPa.

5. A process as claimed in claim 1, in which the acidification acts to allow the water being fed through the bed to enter the bed at a pH of $\leq 6$.

6. A process as claimed in claim 5, in which the acidifying by feeding carbon dioxide into said part of the water is at a pressure of 100–300 kPa, the acidified part of the water being fed in an upflow direction through the bed of particles.

7. A process as claimed in claim 1 which includes recirculating a portion of the water issuing from the bed through the bed, thereby increasing water flow rate through the bed relative to net raw water feed rate to the bed.

8. A process as claimed in claim 7, in which the ratio between the rate of water recirculation and the net raw water feed rate to the bed is 1:1–20:1.

9. A process as claimed in claim 1, in which the stripping of the carbon dioxide from the water issuing from the bed is to an extent such that the amount of carbon dioxide remaining dissolved in the product water exceeds, by no more than 5%, the amount of carbon dioxide dissolved in the water in equilibrium with the atmosphere.

10. A process as claimed in claim 9, in which the stripping is carried out before the water issuing from the bed is mixed with the remainder of the raw water, the stripping taking place in a closed container at a gauge pressure of −6.7 to −20 kPa and being by means of a stripping step selected from the group consisting of the step of passing the water along a cascade and the step of passing the water through a spray, the method further including using carbon dioxide gas stripped from said water at least partially to acidify the part of the raw water which is passed through the bed of calcium carbonate particles, before said part is passed through the bed.

11. A process as claimed in claim 1, which includes dosing the product water with an alkali, the alkali dosing being such that a positive calcium carbonate precipitation potential is achieved, and a pH of the dosed water of 8–9.5 is achieved.

12. A process as claimed in claim 1 in which the feeding of the water through the bed is at a rate such that the average residence time in the bed of the water fed through the bed is 1–30 minutes.

13. In a process for the treatment of raw water having a pH of 2.5–9, an Alkalinity of at most 150 mg/l expressed as calcium carbonate, a calcium content of at most 100 mg/l expressed as calcium carbonate, and a positive calcium carbonate dissolution potential, the process comprising feeding the water through a bed of particles comprising calcium carbonate where said water consumes part of the calcium carbonate of the particles before issuing from the bed, which consumption is associated with an increase in the calcium content of the water and with an increase in the Alkalinity of the water as it passes through the bed, the improvement which comprises, before the water is fed through the bed, separating part of the water from the remainder thereof and acidifying said part of the water to increase its calcium carbonate dissolution potential, increasing the pH of the water issuing from the bed and decreasing the Acidity of the water issuing from the bed, and mixing the water of increased pH and decreased Acidity with the remainder of the raw water, thereby to obtain a product water having a positive calcium carbonate dissolution potential which is at least 2 mg/l calcium carbonate less than the calcium carbonate dissolution potential of the raw water.

* * * * *